(12) United States Patent
Wang et al.

(10) Patent No.: US 9,936,531 B2
(45) Date of Patent: Apr. 3, 2018

(54) METHOD AND DEVICE FOR PROXIMITY DISCOVERY AMONG UES

(71) Applicant: Samsung Electronics Co., Ltd., Gyeonggi-do (KR)

(72) Inventors: Hong Wang, Beijing (CN); Lixiang Xu, Beijing (CN); Xiaowan Ke, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 69 days.

(21) Appl. No.: 14/909,447

(22) PCT Filed: Aug. 1, 2014

(86) PCT No.: PCT/KR2014/007109
§ 371 (c)(1),
(2) Date: Feb. 1, 2016

(87) PCT Pub. No.: WO2015/016659
PCT Pub. Date: Feb. 5, 2015

(65) Prior Publication Data
US 2016/0198506 A1   Jul. 7, 2016

(30) Foreign Application Priority Data
Aug. 1, 2013  (CN) .......................... 2013 1 0331942

(51) Int. Cl.
*H04W 76/02* (2009.01)
*H04W 8/00* (2009.01)
(Continued)

(52) U.S. Cl.
CPC ......... *H04W 76/023* (2013.01); *H04W 8/005* (2013.01); *H04L 41/0233* (2013.01);
(Continued)

(58) Field of Classification Search
CPC ... H04W 76/023; H04W 8/005; H04W 68/02; H04W 4/005; H04L 41/0233; H04L 41/06
See application file for complete search history.

(56) References Cited

U.S. PATENT DOCUMENTS 8,666,403 B2 * 3/2014 Yu .......................... H04W 60/00
                                                       455/406
9,532,204 B2 * 12/2016 Nguyen ................ H04W 8/005
(Continued)

FOREIGN PATENT DOCUMENTS

WO   WO 2012/109531 A2   8/2012

OTHER PUBLICATIONS

International Search Report dated Nov. 26, 2014 in connection with International Patent Application No. PCT/KR2014/007109, 3 pages.
(Continued)

*Primary Examiner* — Brian O'Connor (57) ABSTRACT

The present invention discloses a method for proximity discovery among user equipments (UEs). The method includes: a UE registers with a device to device (DTD) server and obtains DTD default resources from a received registration response. When the UE is a user to be discovered and is not in coverage, it sends a discovery message on the DTD default resources. When the UE is a discovering user, it receives the discovery message on the DTD default resources. The present invention also discloses a device. With the technical solution of the present invention, it is not only possible to support a discovering service and a to-be-discovered service when the UE is in coverage, but also to support the same services when the UE is not in coverage.

16 Claims, 6 Drawing Sheets (51) Int. Cl.
   *H04L 12/24*     (2006.01)
   *H04W 68/02*    (2009.01)
   *H04W 4/00*     (2018.01)

(52) U.S. Cl.
   CPC ............. *H04L 41/06* (2013.01); *H04W 4/005*
                    (2013.01); *H04W 68/02* (2013.01)

(56) References Cited

U.S. PATENT DOCUMENTS

| | | | |
|---|---|---|---|
| 9,674,877 B2* | 6/2017 | Tong | H04W 76/02 |
| 2011/0098043 A1 | 4/2011 | Yu et al. | |
| 2011/0258327 A1 | 10/2011 | Phan et al. | |
| 2014/0120907 A1* | 5/2014 | Yu | H04W 60/00 |
| | | | 455/426.1 |
| 2014/0126581 A1 | 5/2014 | Wang et al. | |
| 2015/0036579 A1* | 2/2015 | Wu | H04B 7/15 |
| | | | 370/312 |
| 2017/0127219 A1* | 5/2017 | Schmidt | H04W 4/005 |

OTHER PUBLICATIONS

Written Opinion of the International Searching Authority dated Nov. 26, 2014 in connection with International Patent Application No. PCT/KR2014/007109, 5 pages.
Gabor Fodor, et al., "Design Aspects of Network Assisted Device-to-Device Communications", IEEE Communications Magazine, IEEE, Mar. 2012, vol. 50, Issue 3, pp. 170-177.
Zte, "Scenarios, Requirements and Scheme Discussion of D2D Discovery", R1-132114, 3GPP TSG-RAN WG1 #73, Fukuoka, Japan May 20-24, 2013, 5 pages.

* cited by examiner

METHOD AND DEVICE FOR PROXIMITY DISCOVERY AMONG UES

CROSS-REFERENCE TO RELATED APPLICATION(S)

The present application claims priority under 35 U.S.C. § 365 to International Patent Application No. PCT/KR2014/007109 filed Aug. 1, 2014, entitled "METHOD AND DEVICE FOR PROXIMITY DISCOVERY AMONG UES", and, through International Patent Application No. PCT/KR2014/007109, to Chinese Patent Application No. 201310331942.3 filed Aug. 1, 2013, each of which are incorporated herein by reference into the present disclosure as if fully set forth herein.

TECHNICAL FIELD

The present invention relates to wireless communication technologies, and more especially, to a method and device for proximity discovery among UEs.

BACKGROUND ART

The modern mobile communication is increasingly tending to provide diversified services for users. Currently, the Department of Public Safety of America has taken an LTE network as the basic communication network of its public safety communication service. A proximity-based service among UEs is an important part of public safety communication demand, including proximity discovery among UEs and proximity communication among UEs. As the basis of direct communication among UEs, the proximity discovery among UEs can judge whether another friend user exists around a user and prompt the user to conduct a next operation. In the field of public safety, the proximity discovery among UEs facilitates members of the execution sector of public safety to command a task and cooperate with each other in a specific field environment, and also provide safety by confidential means. Moreover, in a commercial field, the proximity discovery among UEs can be flexibly applied. It can support rapid formation of a regional social network, such as mutual discovery among proximate users with the same interests, or proximate promotion of commercial advertisements, etc.

Figure 1:
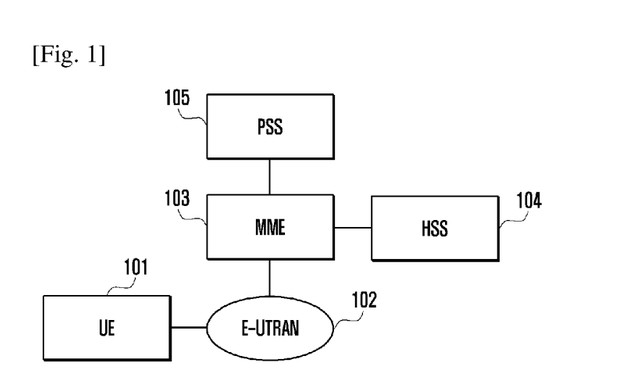
FIG. 1 is a schematic view of the structure of an existing method for proximity discovery among UEs.

FIG. 1 is a schematic view of the structure of an existing method for proximity discovery among UEs.

A user equipment (UE) 101 is a terminal equipment for supporting a proximity-based service with abilities of proximity discovery and being discovered.

The Evolved Universal Terrestrial Radio Access Network (E-UTRAN) 102 is a wireless access network, including a macro base station (eNodeB) providing the UE with the access to an interface of the wireless network, which can provide resource allocation control while a proximity discovery service is being performed on the user equipment (UE) 101.

The Mobile Management Entity (MME) 103 is responsible for managing the mobile context, session context and security information of the UE, which can support service request validation while the proximity-based service is being performed on the User Equipment (UE) 101, provide an identifier list permitted to be found, allocate a to-be-discovered identifier, and direct the Evolved Universal Terrestrial Radio Access Network (E-UTRAN) 102 to conduct the resource allocation control on the user equipment (UE) 101.

The Home Subscriber Server (HSS) 104 is a subsystem of the UE, which is responsible for storing user information, such as the present location of the UE, the address of a service node, the user security information and the packet data context of the UE, as well as the subscription information of the service that the user may access.

The Proximity-based Service Subscriber Server (PSS) 105 is responsible for storing user information, such as the UE and the to-be-discovered identifier used presently by a proximity-based service user as well as the security information and the context of the proximity-based service for the user. The PSS can be an independent node, or co-located with the HSS or the MME.

The method for proximity discovery among UEs can be recognized as part of the proximity-based service, which may be provided for the UE or the user. In the proximity-based service, a readable proximity-based service identifier can be configured as the only identifier for the UE or the user. Specifically, when the proximity-based service is provided for the UE, a proximity-based service identifier can be configured for the UE as the only identifier of the UE in the network. When the proximity-based service is provided for the user, a proximity-based service identifier can be configured for the user as the only identifier of the user.

In the method for proximity discovery among UEs involved in the present invention, configuration of the to-be-discovered identifier for the UE aims at identifying the UE in the process of the proximity discovery among UEs. For the to-be-discovered identifier of the UE, it is acceptable to directly adopt the proximity-based service identifier or take a user application identifier of an application used for calling the proximity-based service. Certainly, in terms of security, it is also acceptable to configure for the UE the to-be-discovered identifier different from the proximity-based service identifier or the user application identifier.

Figure 2:
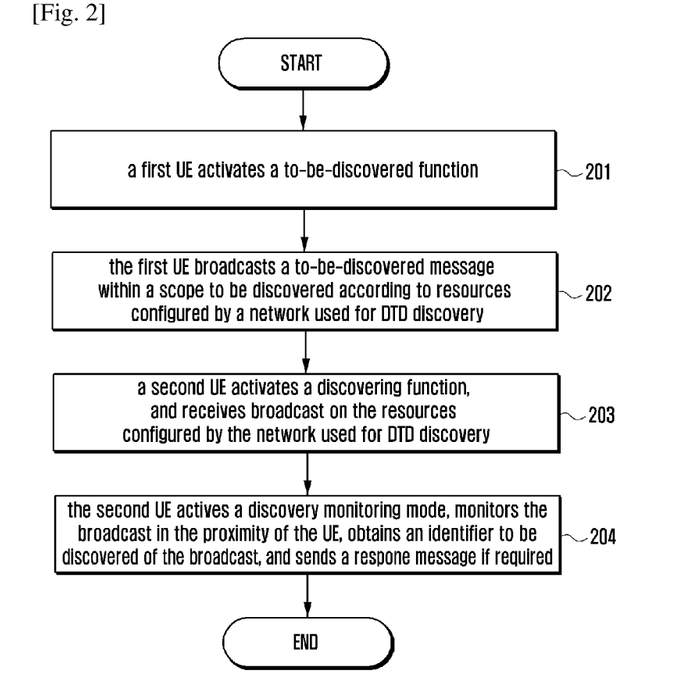
FIG. 2 is a flow chart of the existing method for proximity discovery among UEs based on the structure shown in FIG. 1.

FIG. 2 is a flow chart of the existing method for proximity discovery among UEs based on the structure shown in FIG. 1, including the following steps.

Step 201: A first UE activates a to-be-discovered function, initiates a registration process to a device to device (DTD) server, and obtains a DTD identifier and an expression code of the first UE. In addition, the first UE can further obtain DTD identifiers and group identifiers of other UEs.

A DTD identifier of a UE is configured by the DTD server, which can have various forms. For example, the DTD identifier may be a globally unique identifier, or an identifier having a corresponding relationship with a user identifier of 3GPP, or an identifier being the same as the user identifier of 3GPP.

The expression code of the UE is the identifier of the UE to be discovered for identifying itself in a broadcast signal, which can be the same as or different from the DTD identifier of the UE.

The identifiers of other UEs, in the example, may be an identifier of a second UE.

The group identifier is used to identify a group to which the first UE and the second UE belong.

The first UE activates a to-be-discovered broadcast mode, and a user may have two modes: a discovery mode and a to-be-discovered mode. The to-be-discovered mode refers to that the user broadcasts discovery signals. The discovery mode indicates that the user receives the discovery signals broadcast by other users and when required, sends a message of "proximity indication" to a user to be discovered.

In FIG. 2, the present invention is detailed with an example that the first UE activates the to-be-discovered mode and the second UE activates the discovery mode.

The DTD server sets the to-be-discovered identifier of the first UE. The to-be-discovered identifier is used to identify the first UE in the process of the proximity discovery among UEs. The to-be-discovered identifier can be a fixed identifier or a temporary identifier. The discovery signal broadcast by the user to be discovered can include the to-be-discovered identifier.

Step 202: The first UE broadcasts a to-be-discovered message within a scope to be discovered according to the resources used for DTD discovery configured by the network.

The resources configured by the network may include, but are not limited to, a frequency point, a time slot, a frame, a reuse mode, and power.

The UE can change the scope to be discovered by adjusting the transmission power and other radio parameters.

The broadcast contents may include one or more of the following messages: a DTD identifier of the UE to be discovered, namely the DTD identifier of the first UE; an expression code of the UE to be discovered, namely the expression code of the first UE; a DTD identifier of the discovering UE, in the example, the DTD identifier of the second UE; and a group identifier.

Step 203: The second UE activates a discovering function, initiates a registration process to the DTD server, and obtains the to-be-discovered identifier, the group identifier and other information of the first UE to be discovered. After the registration, the second UE obtains resources used for DTD discovery configured by the network from a serving base station.

Step 204: The second UE activates a discovery monitoring mode, monitors the broadcast in the proximity of the second UE, and obtains a to-be-discovered identifier of the broadcast.

According to the to-be-discovered identifier of the first UE in the monitored broadcast of the first UE, the second UE can identify that the first UE is a UE the second UE wants to discover. Alternatively, if the broadcast contents of the first UE include the identifier of the second UE, it denotes that the first UE wants to search whether the second UE is nearby. The second UE sends a response message to the first UE, indicating that the second UE is in the proximity of the first UE and can receive a signal broadcast by the first UE.

DISCLOSURE OF INVENTION

Technical Problem

The existing process of the proximity discovery among UEs has the following disadvantages.

1) Currently, resources used for DTD discovery are configured via a base station, and if out of coverage, a user cannot obtain the resources used for DTD discovery.

2) The situation that a discovering user or a user to be discovered is not in coverage is not considered at present.

3) A discovering user needs to receive and analyze the resources used for DTD discovery configured by the network. However, in most cases, no discovery signal aiming at the discovering user exists, which may cause energy waste from the perspective of the discovering user.

4) A user to be discovered may be beyond the coverage of a base station, so that it cannot receive resources that can be used by the proximity discovery broadcast by the base station, or send a discovery signal.

5) A discovering user may be beyond the coverage of a base station and cannot receive resources that can be used by the proximity discovery broadcast by the base station, thus it cannot receive a signal sent by a user to be discovered.

Solution to Problem

The present application aims at providing a method and device for proximity discovery among UEs, which not only supports a discovering service and a to-be-discovered service when a UE is in coverage, but also supports the same services when the UE is out of coverage.

The present application discloses a method for proximity discovery among UEs, including:

registering by a UE with a device to device (DTD) server, and obtaining DTD default resources from a received registration response;

when the UE is a user to be discovered and not in coverage, sending by the UE a discovery message on the DTD default resources; and when the UE is a discovering user, receiving by the UE the discovery message on the DTD default resources.

preferably, the method further includes:

when the UE is the user to be discovered and in coverage, broadcasting by the UE the discovery message on resources used for DTD discovery configured by a network;

ending the discovery process if a corresponding response message is received within a specified period; and sending by the UE the discovery message on the DTD default resources if the corresponding response message is not received within the specified period.

Preferably, when the UE is the user to be discovered and in coverage, the method further includes:

broadcasting by the UE the discovery message on the DTD default resources and the resources used for DTD discovery configured by the network.

Preferably, when the UE is the user to be discovered and in coverage, the method further includes:

sending, by the UE, a UE discovery request to the network, to indicate the desire for discovering a second UE; and if the UE receives indicative information from the network that the second UE is out of coverage, sending, by the UE, the discovery message on the DTD default resources.

Preferably, when the UE is the discovering user and in coverage, the method further includes:

receiving, by the UE, the discovery message on the resources used for DTD discovery configured by the network and the DTD default resources.

Preferably, when the UE is the discovering user and out of coverage, the method further includes:

receiving, by the UE, the discovery message on the DTD default resources.

Preferably, if the UE receives the discovery message when it is the discovering user, the method further includes:

if the received discovery message includes an identifier of the said UE, or an identifier of a group the said UE belongs to, sending a response message to another UE that sends the received discovery message.

The present application discloses a device, including a registration module and a discovery module;

wherein the registration module is used to register with a device to device (DTD) server, and obtain DTD default resources from a received registration response; and the discovery module is used to send a discovery message on the DTD default resources when the device is a user to be discovered and not in coverage; and the discovery module is used to receive the discovery message on the DTD default resources when the device is a discovering user.

Advantageous Effects of Invention

It can be seen from the above technical solution that, the technical solution for proximity discovery among UEs provided by the present invention enables the UE to send a discovery message on DTD default resources to other UEs beyond the coverage. The present invention does so by configuring the DTD default resources for the UE when the UE is a user to be discovered and not in coverage. When the UE is a discovering user, it can receive the discovery message sent from another UE beyond the coverage on the DTD default resources. Thus, the present invention not only supports the discovering service and the to-be-discovered service when the UE is in coverage, but also supports the same services when the UE is not in coverage. Besides, the present invention further solves a problem of electricity consumption of the user to be discovered and saves the system resources. The present invention provides a flexible solution for proximity discovery services, which can provide diversified network experience for users and meet the specific communication service demand in public safety and social network fields.

MODE FOR THE INVENTION

To make the purposes, technical solutions and advantages of the present invention more clear, the present invention is further described via embodiments in combination with the drawings.

Figure 3:
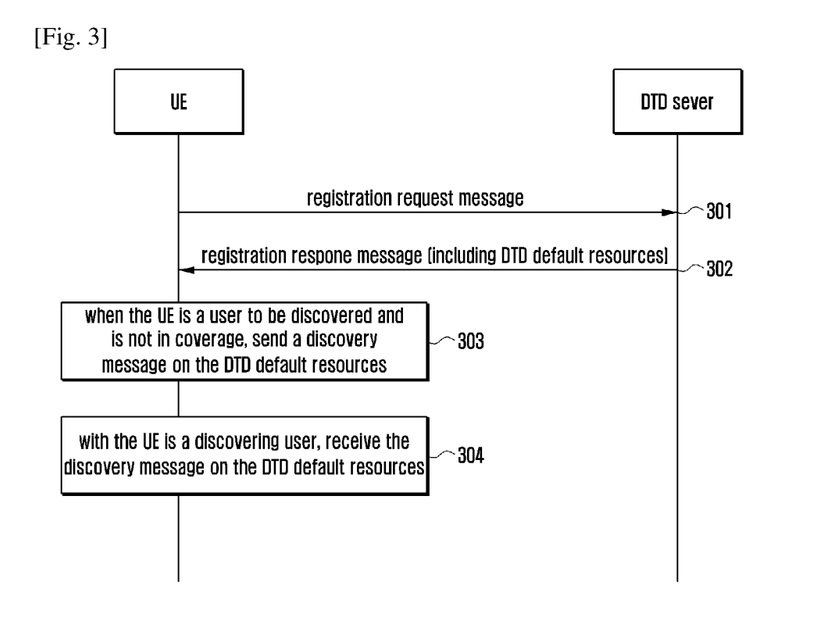
FIG. 3 is a schematic view of the network configuration of DTD default resources of the present invention in the process of DTD service registration.

A method for a network to configure DTD default resources in a process of DTD service registration FIG. 3 is a schematic view of the method for proximity discovery among UEs of the present invention, which includes the following steps.

Step 301: A UE registers with a DTD server.

In the step, the UE can send a registration request message to a DTD coverage, wherein the registration request message includes the identifier of the UE, and the information of the UE ability, such as a discovering ability and a to-be-discovered ability.

Step 302: The UE receives a registration response, and obtains DTD default resources from the registration response.

Except for a DTD identifier, an expression code, a group identifier and other information of the UE, the registration response further includes the DTD default resources. Subsequently, a user beyond the coverage can broadcast a discovery message by means of the DTD default resources. A user in or out of coverage needs to monitor the discovery message on the DTD default resources.

Step 303: When the UE is a user to be discovered and not in coverage, it may send the discovery message on the DTD default resources.

Step 304: When the UE is a discovering user, it may monitor a broadcast message on the DTD default resources to find the discovery message sent by other users.

After the registration, if the UE is in coverage, it can receive the broadcast message from a base station. The base station can configure resources used for DTD discovery by UEs within the coverage. Different resources may be configured for different base stations. A base station may know resources used for DTD discovery configured for its proximity base station via an interface X2.

It is assumed that the UE confirms itself to be a user to be discovered and has been configured with such as the DTD default resources and the DTD identifier after completing the DTD service registration by use of the method shown in FIG. 3. Then, as the UE to be discovered, the UE needs to conduct a first operation and a second operation shown in FIG. 4 by means of the configured DTD default resources. The present invention is further detailed by referring to a schematic view of the operation process of the UE to be discovered of the present invention shown in FIG. 4.

Figure 4:
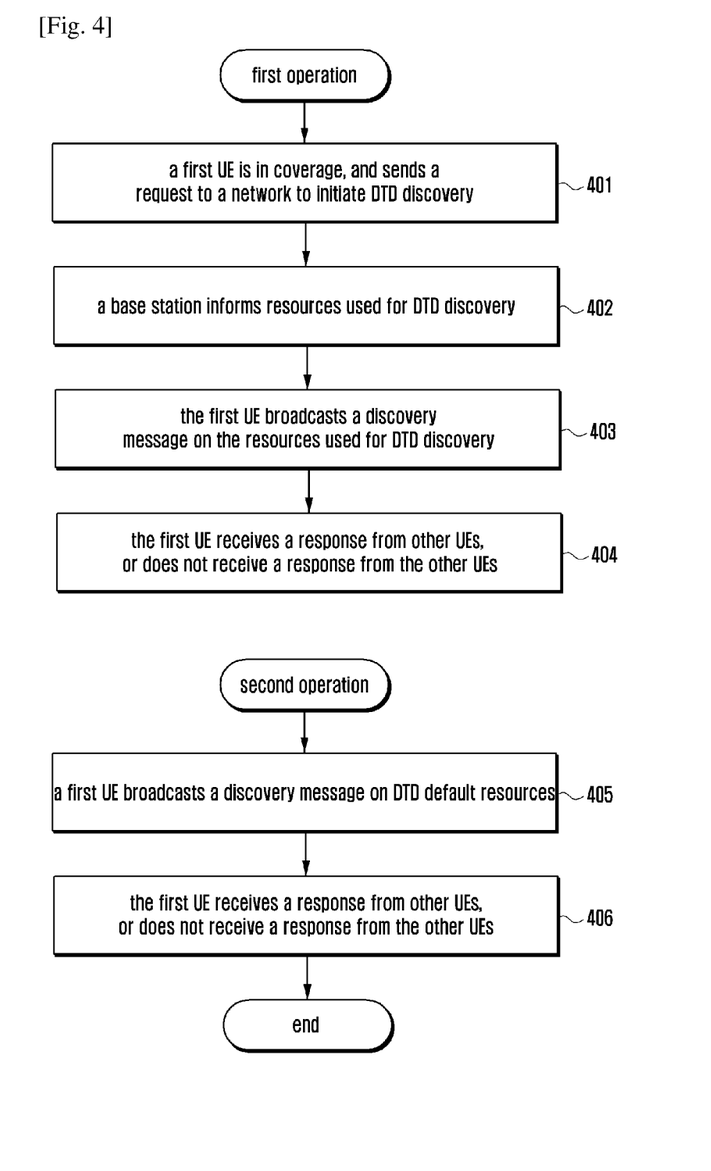
FIG. 4 is a schematic view of the operation process of the UE to be discovered of the present invention.

As shown in FIG. 4, the first operation includes the following steps.

Step 401: A first UE is in coverage and wants to discover another user, namely a second UE, or the first UE wants to discover whether there is a nearby user in the same group. The first UE sends a message to the network, requesting the initiation of DTD discovery, wherein the network includes a base station, an MME, a SGW and a DTD server, and the message can be a RRC message, a NAS message or an application-layer message. It is also acceptable to omit this step and directly execute Step 402.

Step 402: The base station sends resources used for DTD discovery to the first UE via a broadcast channel.

Step 403: As a UE to be discovered, the first UE sends a discovery message on the resources configured in Step 402, wherein the message includes the identifier of the first UE, and can further include the identifier, the group identifier and other information of the second UE.

Step 404: The second UE or another UE receives the discovery message broadcast by the first UE, and determines whether a response message is required to be sent to the first UE. If required, the second UE or another UE will send the response message. After receiving the response message, the first UE can then determine that other UEs are in the vicinity and able to communicate with the first UE. If no response message has been received within a certain period, the discovery process will end.

If the second or other UE is not in coverage, via the above process, the second or other UE will not be able to receive the resources used for DTD discovery broadcast by the base station. Thus, it is unable to conduct monitoring on the resources, receive the discovery message sent by the first UE, or send the response message to the first UE. However, the first UE is not clear about whether other UEs are in coverage. If not receiving the response message from another UE, the first UE may determine that no other UE is nearby, which may be a misjudgement. Therefore, to adapt to all the situations and let the UE make a correct judgement, the present application puts forward a scheme that, the first UE may conduct the second operation at the same time with or after the first operation.

As shown in FIG. 4, the second operation includes the following steps.

Step 405: The first UE broadcasts a discovery message on the DTD default resources.

Step 406: The first UE receives a response from another UE or the second UE, and discovers that a UE in the same group or the second UE is nearby. Then, the process ends.

Thus, the process of the method shown in FIG. 4 is completed.

Assume that the UE confirms itself to be a discovering user and has been configured with the DTD default resources and the DTD identifier, etc., after completing the DTD service registration with the method shown in FIG. 3. Then, as the discovering UE, the UE needs to conduct a first operation and a second operation shown in FIG. 5 by means of the configured DTD default resources. Herein, for the first operation, the UE needs to monitor whether the discovery message for itself exists on the DTD default resources. For the second operation, the UE needs to monitor whether the discovery message for itself exists on the resources used for DTD discovery configured by the base station, wherein this operation can be conducted while the network is configuring the resources used for DTD discovery. The present invention is further detailed by referring to a schematic view of an operation process of the discovering UE of the present invention shown in FIG. 5.

Figure 5:
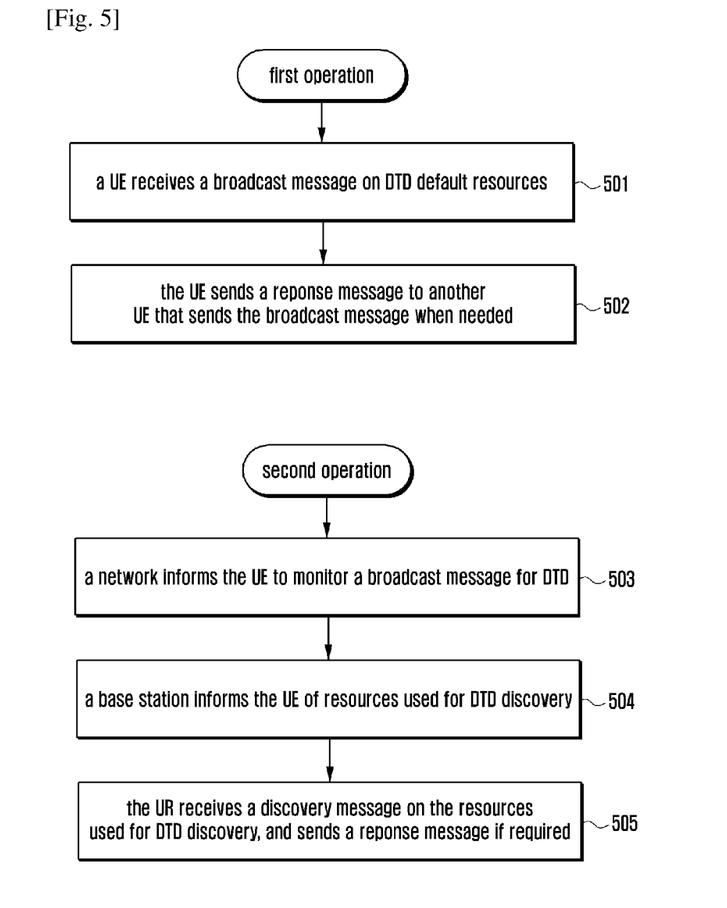
FIG. 5 is a schematic view of the operation process of the discovering UE of the present invention.

As shown in FIG. 5, a first operation of the operation process of the discovering UE includes the following steps.

Step 501: A UE receives a broadcast message on DTD default resources.

Step 502: When receiving a discovery message including the identifier of the UE or the identifier of the group the UE belongs to, the UE sends a response message to another UE that sends the discovery message.

As shown in FIG. 5, a second operation of the operation process of the discovering UE includes the following steps.

Step 503: The UE receives a message from the network, informing that the UE needs to receive a broadcast message of DTD, wherein the network includes a base station, an MME, a SGW and a DTD server, and the message can be a RRC message, a NAS message or an application-layer message. It is also acceptable to omit the step and directly execute Step 504.

Step 504: A base station informs the UE of resources used for DTD discovery in a form of broadcast message.

Step 505: The UE receives a broadcast message from other UEs nearby on the resources used for DTD discovery, and if required, the UE may send a response message to another UE that sends the broadcast message.

The technical solution of the present application is further set forth via two preferred embodiments as below.

Embodiment 1

Figure 6:
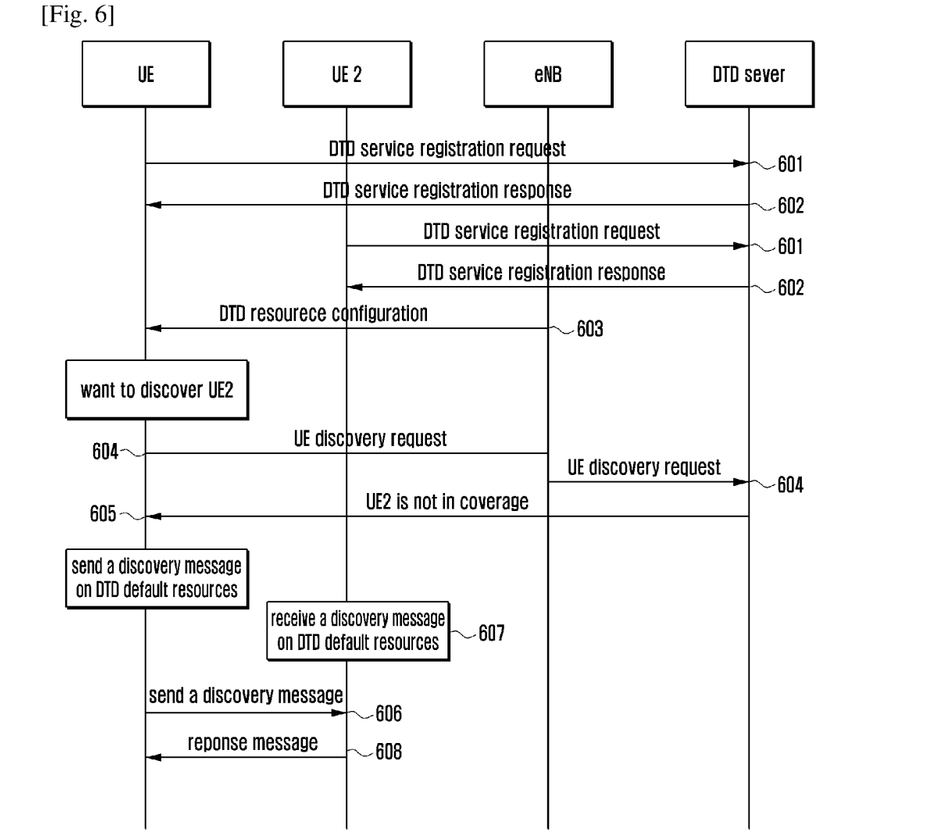
FIG. 6 is a flow chart of the method for proximity discovery among UEs according to Embodiment 1 of the present invention.

In the embodiment, the present invention is detailed with an example that the UE to be discovered is in coverage while the discovering UE is out of coverage. FIG. 6 is a flow chart of a method for proximity discovery among UEs according to Embodiment 1 of the present invention. In FIG. 6, UE1 is the UE to be discovered, and UE2 is the discovering UE. The method includes the following steps.

Step 601: UE1 sends a registration request message for a DTD service to a DTD server. Herein, the registration request message includes the identifier of the UE and the information of the UE ability, such as a discovering ability and a to-be-discovered ability.

Step 602: UE1 receives a registration response message for the DTD service from the DTD server, and obtains DTD default resource configuration from the response message.

The registration response message for the DTD service includes a DTD identifier, an expression code, a group identifier and other information of the UE, and is further configured with the DTD default resource configuration. Subsequently, a user out of coverage can broadcast a discovery message by means of the DTD default resources; a user in or out of coverage needs to monitor the resources.

UE2 executes the registration process of Steps 601 and 602, as well.

Step 603: The base station sends the resources used for DTD discovery to various UEs in a form of broadcast message. Since UE2 is not in coverage, it will not receive the message broadcast by the base station.

Step 604: Since UE1 wants to discover UE2, it sends a UE discovery request to the network, which will be sent to the DTD server via the base station.

Step 605: Via 3GPP network nodes, the DTD server knows UE2 is out of coverage and sends a message to UE1, wherein the message includes indicative information that UE2 is not in coverage.

Step 606: UE1 sends a discovery message on the DTD default resources.

Step 607: UE2, which is not in coverage, monitors the discovery message on the DTD default resources.

Step 608: After receiving the discovery message sent by UE1, UE2 sends a response message to UE1, indicating that UE2 is in the proximity of UE1.

Embodiment 2

Figure 7:
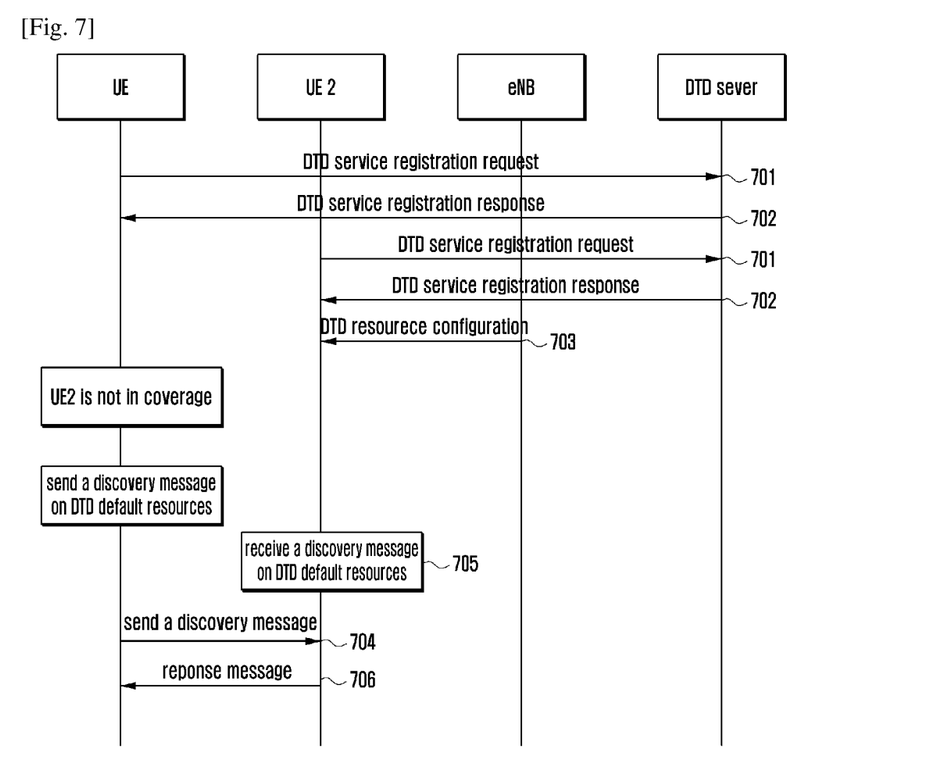
FIG. 7 is a flow chart of the method for proximity discovery among UEs according to Embodiment 2 of the present invention.

In the embodiment, the present invention is detailed with an example that a UE to be discovered is not in coverage while a discovering UE is in coverage. FIG. 7 is a flow chart of a method for proximity discovery among UEs according to Embodiment 2 of the present invention. In FIG. 7, UE1 is the UE to be discovered, and UE2 is the discovering UE. The method includes the following steps.

Step 701: UE1 sends a registration request message for a DTD service to a DTD server, wherein the registration request message includes the identifier of the UE and the information of the UE ability, such as a discovering ability and a to-be-discovered ability.

Step 702: UE1 receives a registration response message for the DTD service from the DTD server, and obtains DTD default resource configuration from the response message.

The registration response message for the DTD service includes a DTD identifier, an expression code, a group identifier and other information of the UE, and is further configured with the DTD default resource configuration. Subsequently, a user out of coverage can broadcast discovery messages by means of the DTD default resources; a user in or out of coverage needs to monitor the resources.

UE2 executes the registration process of Steps 701 and 702, as well.

Step 703: The base station sends resources used for DTD discovery to various UEs in a form of broadcast message.

Since UE1 is not in coverage, it will not receive the message broadcast by the base station.

Step 704: Since UE1 wants to discover UE2, it sends a discovery message on the DTD default resources.

Step 705: UE2 monitors the discovery message on both broadcast resources used by the discovery message and the DTD default resources.

Step 706: After receiving the discovery message sent by UE1, UE2 sends a response message to UE1, indicating that UE2 is in the proximity of UE1.

Figure 8:
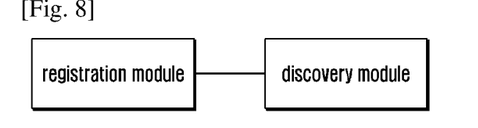
FIG. 8 is a schematic view of the structure of a preferable device of the present invention.

Corresponding to the above method, the present application further provides a device as shown in FIG. 8, including a registration module and a discovery module.

The registration module is used to register with a DTD server and obtain DTD default resources from a registration response received.

The discovery module is used to send a discovery message on the DTD default resources when the device is a user to be discovered and not in coverage. When the device is a discovering user, the discovery module is used to receive a discovery message on the DTD default resources.

The technical solution for proximity discovery among UEs provided by the present invention enables a UE to send discovery messages on DTD default resources to other UEs out of coverage by configuring the DTD default resources for the UE when the UE is a user to be discovered and not in coverage. When the UE is a discovering user, it can receive discovery messages sent by the other UEs beyond the coverage on the DTD default resources. It thus enables the UE to obtain resources used for DTD discovery no matter the UE is in coverage or not, solves a problem that the resources used for DTD discovery cannot be obtained when the UE is not in coverage, and further solves a problem of high energy consumption of the UE. The present invention puts forward a complete solution in network discovery and other aspects. The present invention provides a flexible solution for a proximity discovery service, which can provide diversified network experiences for users and meet specific demands for communication services on public safety and social networking fields.

The description above is only preferred embodiments of the present invention other than any limitation to the invention. Any modification, equivalent substitution or improvement within the spirit and principle of the present invention shall be covered in the protection scope of the present invention.

The invention claimed is:

1. A method for proximity discovery among user equipments (UEs), the method comprising:
   transmitting, by a first UE, a registration request message to a device to device (D2D) server;
   receiving, by the first UE, a registration response message including D2D default resources from the D2D;
   transmitting, by the first UE, a first discovery message based on the D2D default resources, if the first UE is not in a coverage of a base station;
   receiving, by the first UE, D2D resources configuration information from the base station, if the first UE is in the coverage of the base station; and
   broadcasting, by the first UE, a second discovery message based on resources included in the D2D resources configuration information.

2. The method of claim 1, further comprises:
   transmitting, by the first UE, the first discovery message based on the D2D default resources if a response message corresponding to the second discovery message is not received within a predetermined period.

3. The method of claim 1, further comprises:
   receiving, by the first UE, a response message corresponding to the first discovery message based on the D2D default resources from a second UE.

4. The method of claim 1, further comprises:
   transmitting, by the first UE, a UE discovery request message including a request for discovering a second UE to the base station if the first UE is in the coverage; and
   transmitting, by the first UE, the first discovery message based on the D2D default resources if the first UE receives information indicating that the second UE is out of the coverage from the base station.

5. The method of claim 1, further comprises:
   receiving, by the first UE, a third discovery message based on the resources included in the D2D resource configuration information from a second UE; and
   transmitting, by the first UE, a response message corresponding to the third message based on the resources included in the D2D resource configuration information to the second UE.

6. The method of claim 1, further comprises:
   receiving, by the first UE, a third discovery message based on the D2D default resources from a second UE; and
   transmitting, by the first UE, a response message corresponding to the third discovery message based on the D2D default resources to the second UE.

7. The method of claim 5, further comprises:
   determining, by the first UE, whether the third discovery message includes at least one of an identifier of the first UE and an identifier of a group of the first UE,
   transmitting the response message corresponding to the third discovery message, if the third discovery message includes at least one of the identifier of the first UE and the identifier of the group of the first UE.

8. The method of claim 6, further comprises:
   determining, by the first UE, whether the third discovery message includes at least one of an identifier of the first UE and an identifier of a group of the first UE,
   transmitting the response message corresponding to the third discovery message, if the third discovery message includes at least one of the identifier of the first UE and the identifier of the group of the first UE.

9. A user equipment (UE) comprising:
   a transceiver configured to transmit or receive a signal or data; and
   a controller configured to control:
      transmitting a registration request message to a device to device (D2D) server;
      receiving a registration response message including D2D default resources from the D2D server;
      transmitting a first discovery message based on the D2D default resources, if the UE is not in coverage of a base station;
      receiving D2D resources configuration information from the base station, if the UE is in the coverage of the base station; and
      broadcasting a second discovery message based on resources included in the D2D resources configuration information.

10. The UE of claim 9, wherein the controller is further configured to control:
    transmitting the first discovery message based on the D2D default resources if a response message corresponding to the second discovery message is not received within a predetermined period.

11. The UE of claim 9, wherein the controller is further configured to control:
receiving a response message corresponding to the first discovery message based on the D2D default resources from a second UE.

12. The UE of claim 9, wherein the controller is further configured to control:
transmitting a UE discovery request message including a request for discovering a second UE to the base station, if the UE is in the coverage; and
transmitting the first discovery message based on the D2D default resources if the UE receives information indicating that the second UE is out of the coverage from the base station.

13. The UE of claim 9, wherein the controller is further configured to control:
receiving a third discovery message based on the resources included in the D2D resource configuration information from a second UE; and
transmitting a response message corresponding to the third discovery message based on the resources included in the D2D resource configuration information to the second UE.

14. The UE of claim 9, wherein the controller is further configured to control:
receiving a third discovery message based on the D2D default resources from a second UE; and
transmitting a response message corresponding to the third discovery message based on the D2D default resources to the second UE.

15. The UE of claim 13, wherein the controller is further configured to control:
determining whether the third discovery message includes at least one of an identifier of the UE and an identifier of a group of the UE,
transmitting the response message corresponding to the third discovery message, if the third discovery message includes at least one of the identifier of the UE and the identifier of the group of the UE.

16. The UE of claim 14, wherein the controller is further configured to control:
determining whether the third discovery message includes at least one of an identifier of the UE and an identifier of a group of the UE,
transmitting the response message corresponding to the third discovery message, if the third discovery message includes at least one of the identifier of the UE and the identifier of the group of the UE.

* * * * *